Dec. 6, 1955  J. B. LINDSAY  2,725,846
APPARATUS FOR DISPENSING COATING MATERIALS
INTO CATHODE-RAY TUBE ENVELOPES
Original Filed Feb. 24, 1949  9 Sheets-Sheet 1
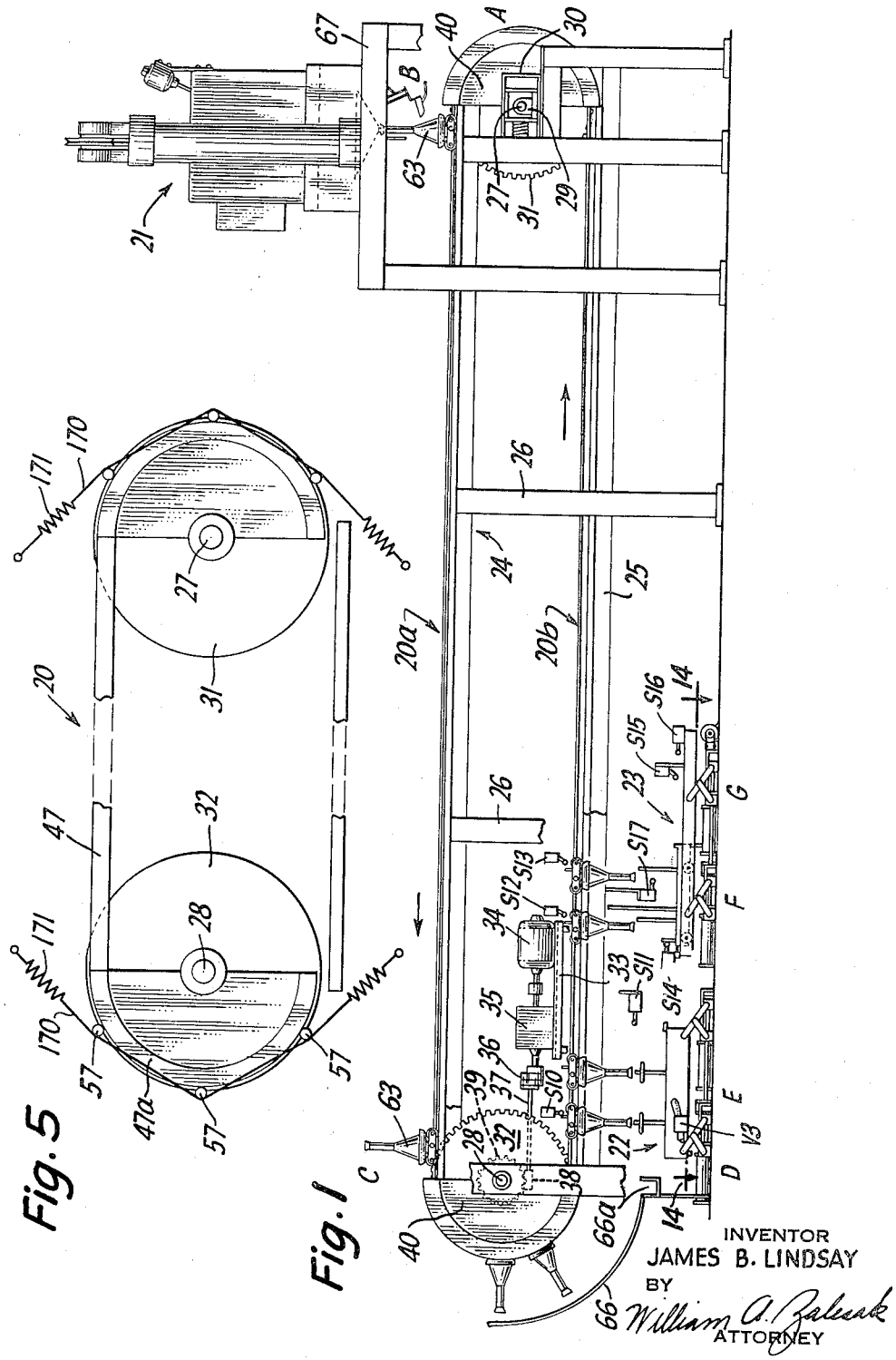
INVENTOR
JAMES B. LINDSAY
BY
William A. Zalesak
ATTORNEY

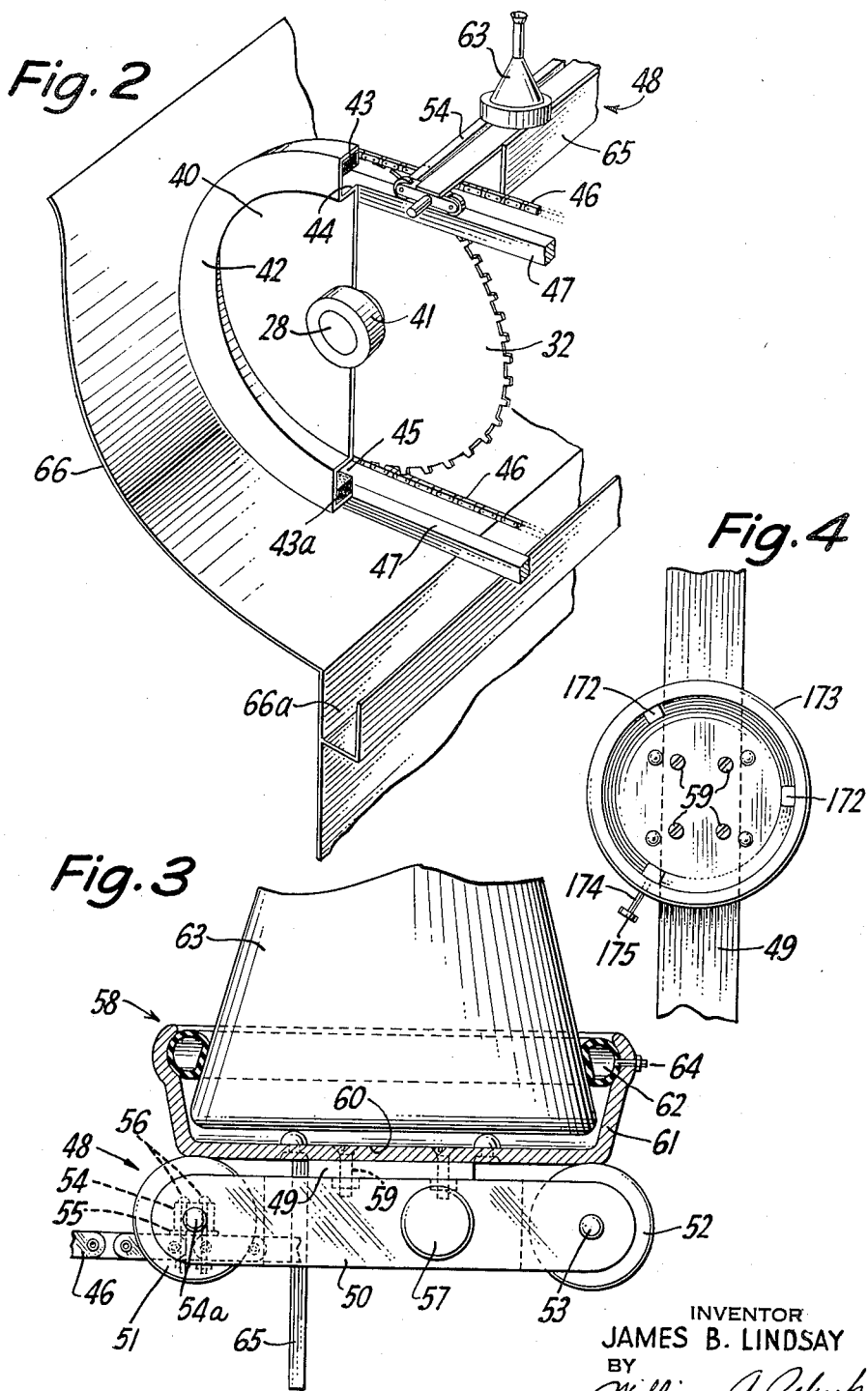

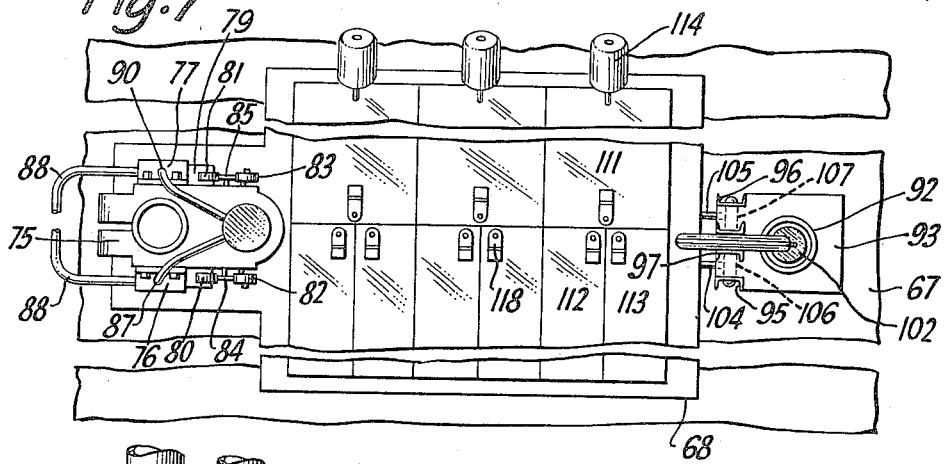
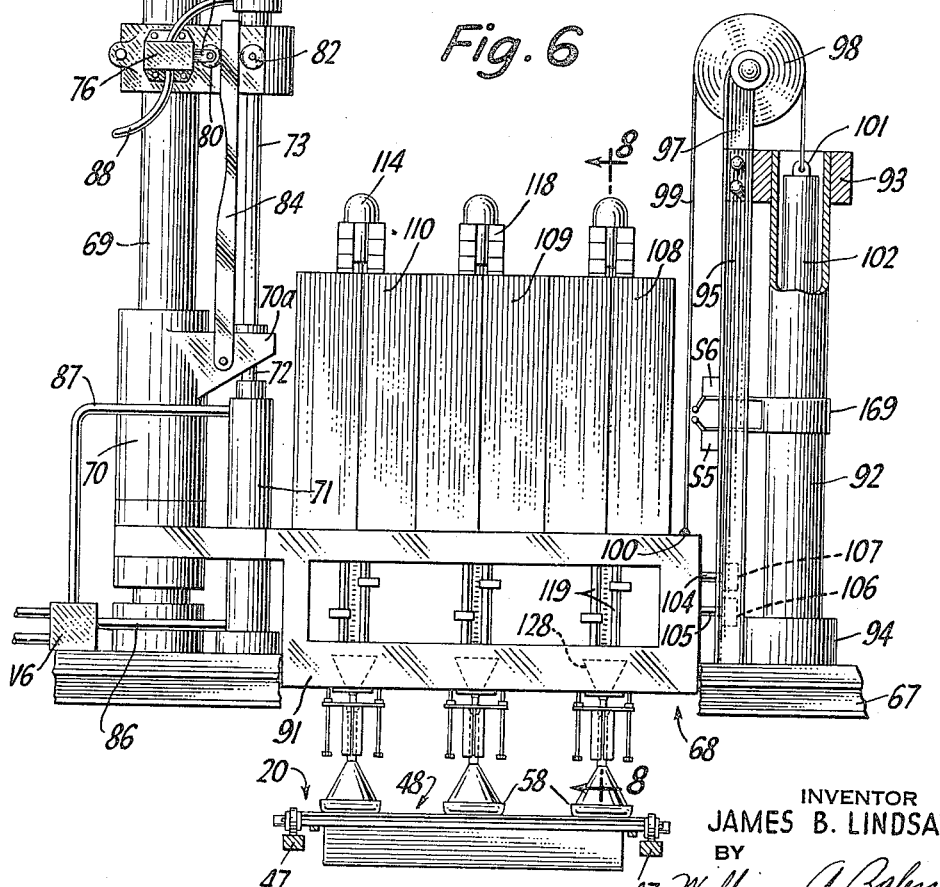

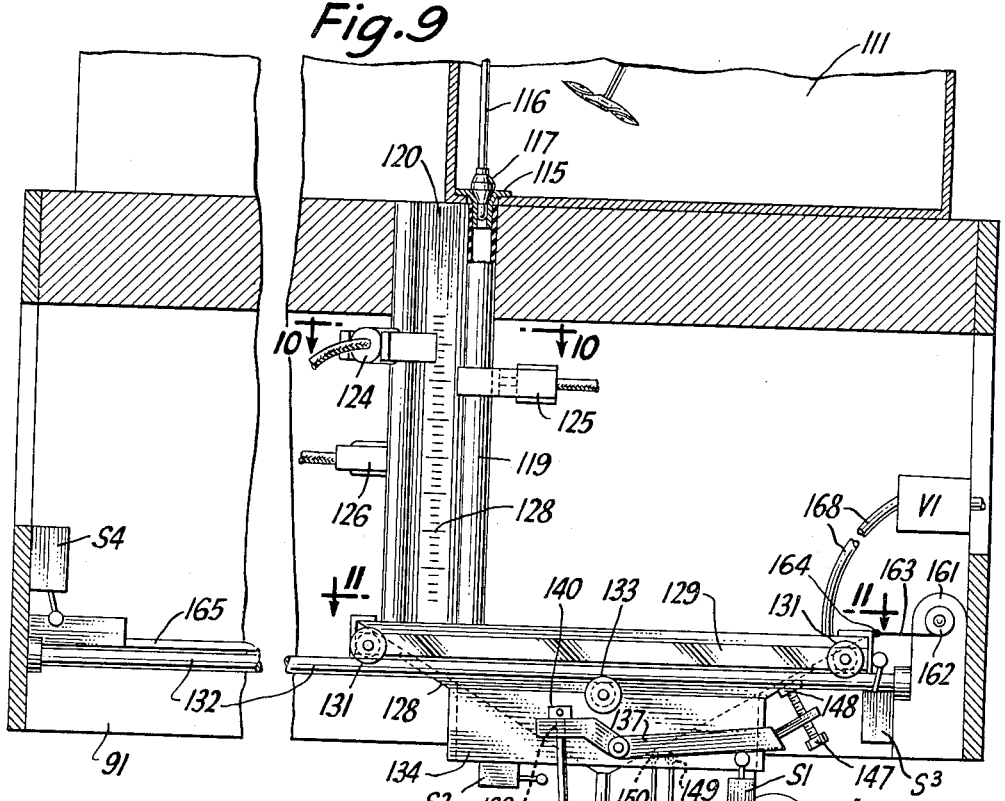

Dec. 6, 1955   J. B. LINDSAY   2,725,846
APPARATUS FOR DISPENSING COATING MATERIALS
INTO CATHODE-RAY TUBE ENVELOPES
Original Filed Feb. 24, 1949   9 Sheets-Sheet 6
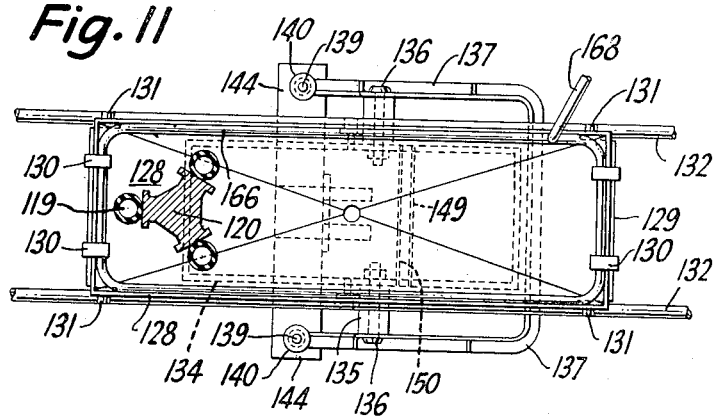
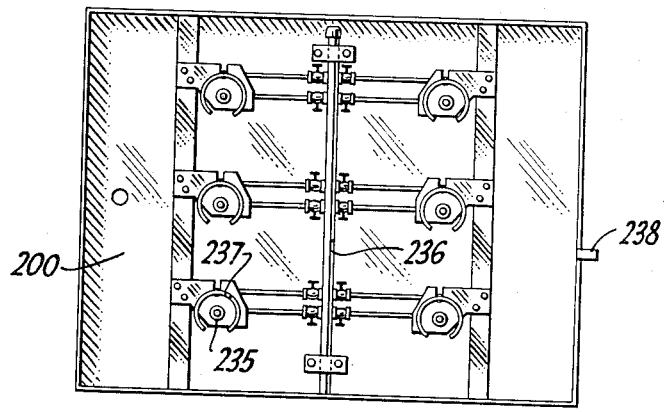
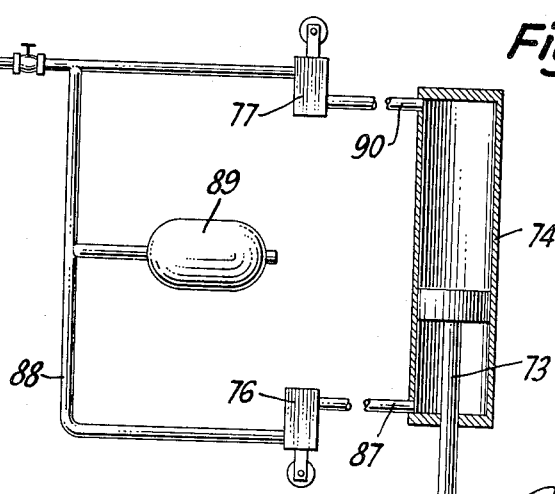
INVENTOR
JAMES B. LINDSAY
BY
William A. Zalesak
ATTORNEY

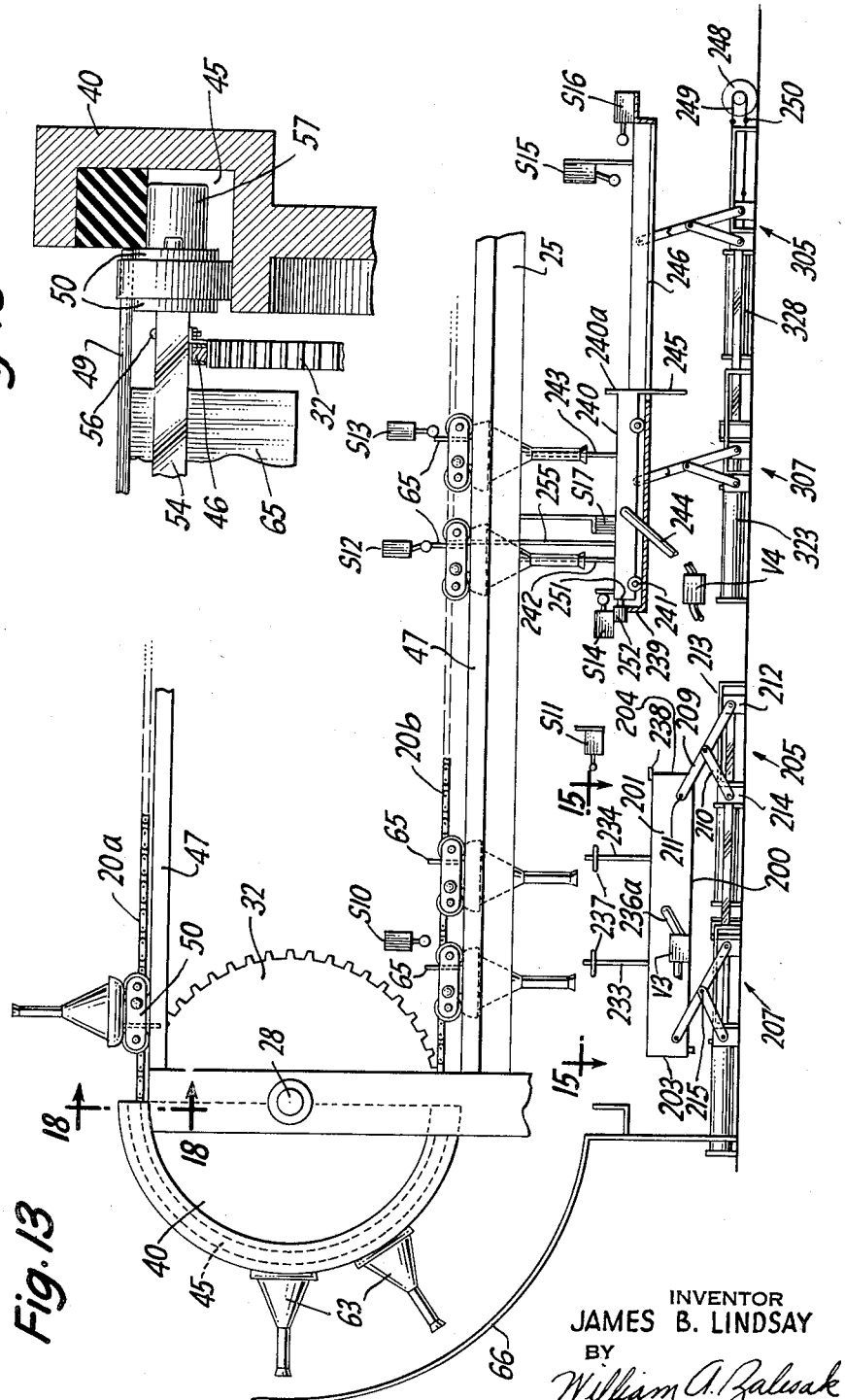

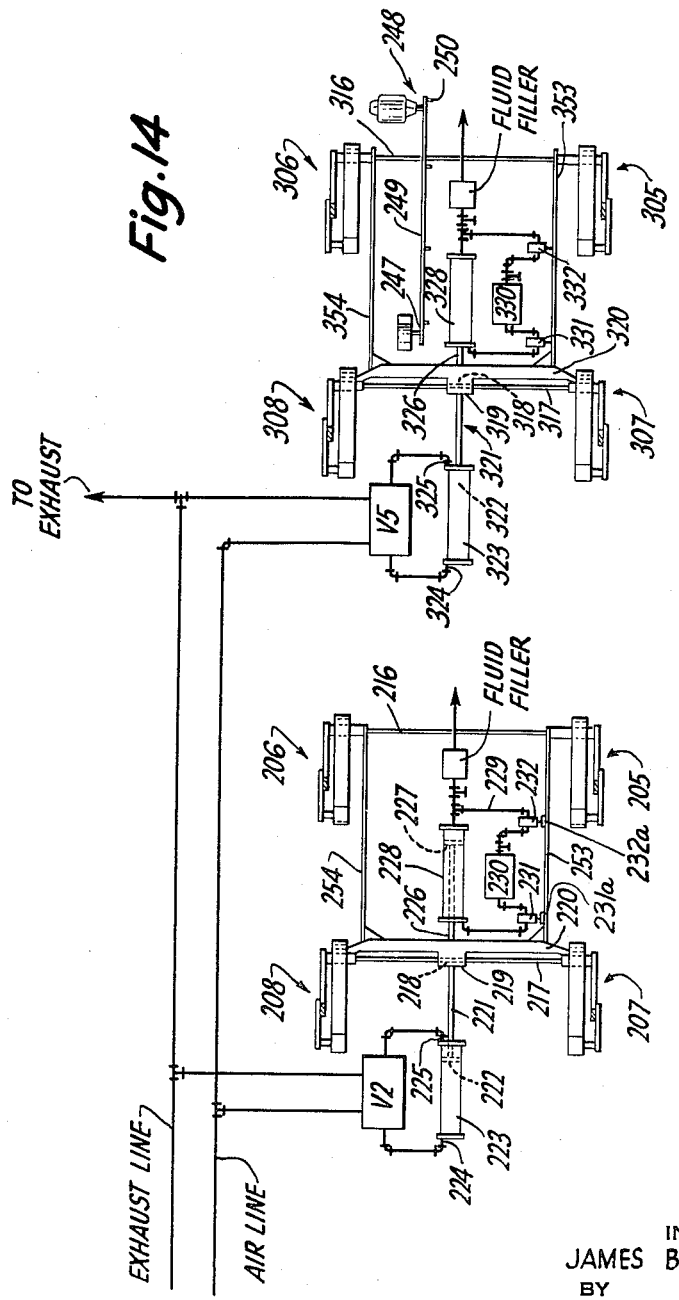

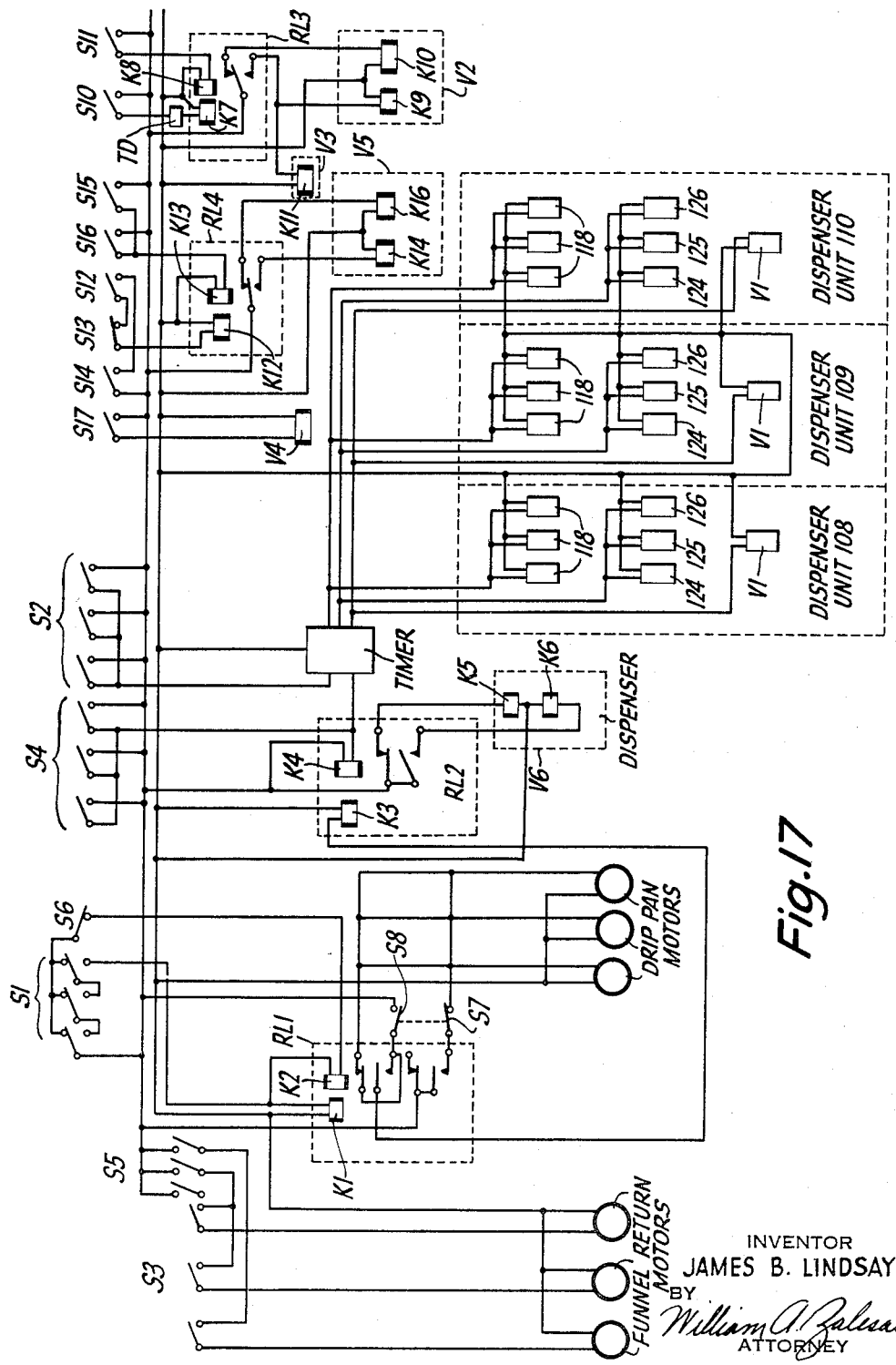

United States Patent Office 2,725,846
Patented Dec. 6, 1955

2,725,846

APPARATUS FOR DISPENSING COATING MATERIALS INTO CATHODE-RAY TUBE ENVELOPES

James B. Lindsay, Millburn, N. J., assignor to Radio Corporation of America, a corporation of Delaware Original application February 24, 1949, Serial No. 78,077, now Patent No. 2,646,769, dated July 28, 1953. Divided and this application April 24, 1953, Serial No. 350,805

15 Claims. (Cl. 118—2)

This invention relates to the formation of coatings and more particularly to an apparatus for facilitating the production of such coatings which are applied in the form of a mechanical mixture or suspension and then allowed to settle out upon the surface to be coated.

This is a division of my application Serial No. 78,077, now Patent No. 2,646,769, filed February 24, 1949, and assigned to the same assignee as the present application.

One example of such coatings is the luminescent screen on the face or end of a cathode-ray tube envelope which, insofar as I am familiar therewith, were applied by a so-called "tilt table" apparatus prior to the advent of the method and apparatus disclosed in the co-pending application of J. Kent Burton, Serial Number 67,964, filed December 29, 1948, and now Patent No. 2,646,773, in accordance with which objects having surfaces onto which particles suspended in solution are to be applied, are moved continuously and at a constant speed through various positions such as dispensing, settling, recanting, washing and drying.

Such screens usually consist of several ingredients which must be maintained separate until they are intermingled at the time the coating is to be formed and may include a concentrate of a phosphor, an electrolyte, a binder and water. When these ingredients are brought together in the proper proportions a luminescent screen consisting of a binder and a phosphor is formed from which excess liquid is removed and the screen dried. Not only should the ingredients be added in accurately measured quantities but the order in which they are added has also been found to affect the quality of the screen formed. Furthermore the nature of these ingredients is such that if they come into contact with parts of the object other than that intended to receive the coating, such parts receive an objectionable film.

Heretofore such objects have been individually charged with coating ingredients necessitating the presence of an operator to perform this function and who had to exercise constant care to avoid smearing inner or outer surfaces of the tube envelope with coating ingredients. Then the screen forming particles were settled, care being taken to avoid mechanical shocks or vibration which would disturb the even settling of the particles and hence the uniform density of the screen.

Thus, a principal object of my invention is to provide an apparatus to facilitate the application of screens or coatings formed by the settling out of particles from mechanical solution onto the surface to be coated thereby.

Another object of my invention is the provision of such apparatus which is fully automatic in operation.

A further object is to provide such apparatus which operates substantially free from vibration and which produces substantially uniform coatings free from blemishes.

Yet another object is the provision of means which facilitate the insertion and removal of objects to be coated by the apparatus.

A still further object is the provision of such apparatus which is so precise in its timed operations and which is so constructed as to reduce to a minimum or remove entirely the possibility that relatively fragile objects will become chipped, cracked or broken.

Other objects will appear as the nature of my invention is more fully understood from the following description taken in conjunction with the accompanying drawings wherein like parts are identified by identical numerals in the several views.

In the accompanying drawings, wherein is shown, by way of illustration, one of the embodiments which the present invention may take:

Figure 1 is a side elevational view on a reduced scale of an apparatus constructed in accordance with my invention;

Figure 2 is a fragmentary perspective view of the left end of the apparatus shown in Figure 1;

Figure 3 is a sectional view on an enlarged scale of the envelope holder with the carriage therefor shown in elevation;

Figure 4 is a plan view of a modified holder;

Figure 5 is a schematic view illustrating another embodiment of the means for guiding the carriages around the ends of the conveyor;

Figure 6 is a front elevational view of the dispenser;

Figure 7 is a plan view of the dispenser;

Figure 9 is a view similar to Figure 8 with the parts shown in position prior to actuation;

Figure 10 is a sectional view through the line 10—10 of Figure 9 with the discharge tubes shown open;

Figure 11 is a sectional view through the line 11—11 of Figure 9;

Figure 12 is a sectional view on an enlarged scale through the line 12—12 of Figure 9;

Figure 13 is a side elevational view partially in section of the rinse and dry apparatus shown in Figure 1;

Figure 14 is a sectional view through the line 14—14 of Figure 1;

Figure 15 is a view along the line 15—15 of Figure 13 in the direction indicated;

Figure 16 is a schematic view of the hydraulic system for controlling the dispenser elevating mechanism;

Figure 17 is a schematic wiring diagram of the apparatus; and

Figure 18 is a sectional view on an enlarged scale through the line 18—18 of Figure 13.

Figure 8:
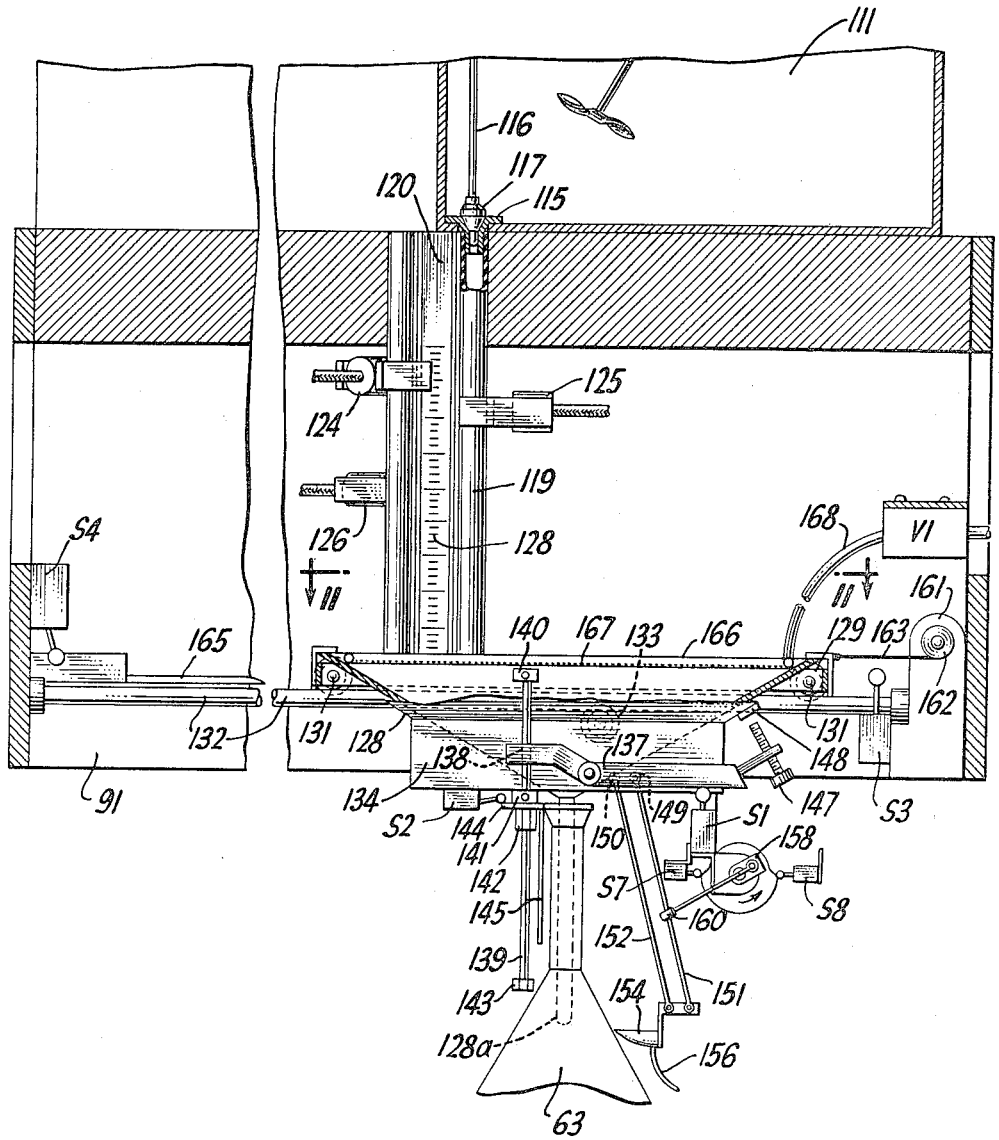
Figure 8 is a sectional view on an enlarged scale through the line 8—8 of Figure 6.

Referring first to Figure 1, it will be seen that my apparatus may include an endless belt type conveyor 20, a dispenser 21, rinse apparatus 22 and drying apparatus 23. Objects such as cathode-ray tube envelopes when loaded on a constantly moving conveyor 20 at station A, are carried through dispensing station B where they automatically receive a charge of coating or screen forming ingredients from dispenser 21. The envelopes continue in movement substantially undisturbed for a time long enough to permit even settling of the coating. On arriving in position C the coating forming particles have settled and between C and D excess liquid is poured off. The pouring off of excess liquid is carried out in an extremely slow and steady manner to avoid disturbance of the screen or coating by the liquid. Then between E and G the coatings are set. Thus, at E the envelope necks may be rinsed while between F and G the screens or coatings may be air dried. On returning to A, the envelopes with screens formed thereon are removed.

*The conveyor*

Referring now to Figures 1-6 in detail, conveyor 20 is seen to have a main supporting frame indicated generally at 24 having suitably interconnected horizontal and vertical members 25, 26 as required. Supported by the frame and at each end thereof are rotatably mounted shafts 27, 28. Shaft 27 is mounted at each of its ends in bushings 29 (only one of which being shown) adjustably movable in housings 30 by means of adjusting screws and springs. A pair of idler sprockets 31 are mounted to rotate with shaft 27, one adjacent each end thereof. A pair of drive sprockets 32, one in alinement with each of idler sprockets 31 are mounted to rotate with drive shaft 28 on opposite ends. On a separate support 33 which is not connected in any manner to frame 24 is a motor 34 connected to a source of electrical power supply and to a reduction gear 35 which in turn is connected through a system of resilient belts 36 and pulleys to one end of shaft 37. On the other end of shaft 37 is a worm gear 38 which meshes with a suitable gear 39 keyed to shaft 28. It is to be noted that the only connection between the main conveyor and the motor platform is the belts 36 which serve to prevent the transmission of undesirable vibration from the motor to the conveyor.

Also, supported at each end of frame 24 are four substantially semi-circular guide plates 40, one such plate being disposed outwardly of and concentric with each of the two idler sprockets 31 and the two drive sprockets 32. As most clearly shown in Figure 2, plates 40 may be suitably connected to each bushing 41 in which the shaft 28 is rotatably mounted and to bushings 29 at the other end of conveyor 20. A channeled arcuate guide 42 is connected adjacent to the periphery of each guide plate 40 and has an outside track 43 and an inside track 44 forming arcuate channel 45. Each outside track 43 may be provided with a facing or layer 43a of resilient material such as rubber or the like.

Two roller link endless chains 46, one stretched over and in mesh with each set of alined drive and idler sprockets, form an upper course 20a and a lower course 20b. Rails 47 are disposed one on each side of upper course 20a and lower course 20b and extend parallel to the same. Thus, there are four rails 47, the upper pair of which are clearly shown in Figure 6 while each rail of the lower pair is below one of the upper rails and in alinement therewith. Rails 47 may be connected to horizontal frame members 26 along their length and supported thereby in spaced relation with respect to the chains.

A plurality of carriages indicated generally at 48, Figures 2 and 3, are carried by the conveyor, interconnecting the two chains and supported by the rails 47, while those carriages passing around the ends of the conveyor from the upper to the lower course or from the lower to the upper course are supported by the respective guides 42. Each carriage includes a cross piece 49 which is connected at each of its ends to the upper portions of side plates or trucks 50. Each truck 50 is recessed at one end thereof to receive a leading roll 51 and at the other end to receive a trailing roll 52. Trailing rolls 52 are rotatably mounted on pins 53 while leading rolls 51 are rotatably mounted on a stub shaft 54a at each end of a connecting rod 54 which extends between the side plates or trucks 50 and thus serves to interconnect the centers of leading rolls 51 of the carriage. At the point where connecting rod 54 passes each chain it is connected thereto by flanges 55 and bolts 56 or the like. It is to be understood that while connecting rod 54 is rigidly connected to the chains, side plates or trucks 50 are free to rotate about stub shafts 54a and are therefore rotatable with respect to the chains the purpose of which will be more fully pointed out hereinbelow. Rotatably mounted on the outer surface of each side plate or truck 50 is a guide roll 57 of such diameter and length as to extend beyond rails 47 and enter channel 45 and pass therethrough in rolling engagement with the corresponding outer tracks 43 as the carriages pass around the sprockets from the upper course to the lower course and also at the opposite end when they pass around the idler sprockets from the lower course to the upper course.

Each carriage 48 carries holders 58 connected in spaced relation on the outer or upper surface of cross pieces 49 (looking in the direction of Fig. 3) by means of bolts 59 or the like. As is apparent in Figure 6 each carriage may carry three such holders 58 though the apparatus may be designed for more or less as desired. Thus, in the present instance there are three lines of holders which extend longitudinally of the conveyor while the rows which extend transversely of the conveyor each consist of three holders and there are as many such rows as there are carriages. Each holder 58 includes a receiver having a base 60 and an upstanding annular wall 61. Wall 61 has an annular recess or channel formed therein adjacent its upper or open end in which is positioned an endless inflatable tube 62 substantially D-shaped in cross-section. I have found that such a D-shaped tube permits the ready insertion and withdrawal of an object such as cathode-ray tube envelope 63 when deflated and yet securely retains the envelopes in the holders when inflated. An air valve is connected to tube 62 by means of stem 64 which passes through an opening in wall 61.

Also connected to each cross-piece 49 and depending therefrom (Figure 3) is an actuator bar 65 which as will be seen operates various switches as it is carried around the path described by the carriages.

As is apparent in Figure 1, dispenser 21 is located over and adjacent one end of conveyor 20. In alinement with the conveyor and spaced from the other end thereof is a splash shield 66 (Fig. 2) having a trough 66a disposed to receive liquid collected by the shield and conduct the same to a container or sewer (not shown).

Carriages 48 are of such dimensions that rolls 51, 52 on each side thereof are in registration with and travel on the corresponding rails of either the upper or lower course of the conveyor. As each carriage approaches the left hand end of upper rails 47 each guide roll 57 engages one of the arcuate outer tracks 43 on guide 42. The curvature of track 43 is such that as guide roll 57 travels along the same rolls 51, 52 are maintained in contact with inside track 44 since the carriages are free to rock about the connecting rods 54. When the carriages complete the circuit of guides 42, 180° around the drive sprockets, their rolls have just been positioned on the lower rails and thus as the rolls leave the inside track 44 they are already rolling freely on said lower rails. When the carriages arrive at the right hand end of the lower course the guide rolls 57 are once again similarly engaged by the arcuate guides 40 associated with idler sprockets 31 and the carriages are guided and supported around the idler sprockets as previously pointed out in connection with the drive sprocket end of the conveyor.

During operation the conveyor is constantly driven at a uniform speed by motor 34. The distance between the centers of shafts 27 and 28 is selected so that the carriages may traverse the path described by the conveyor at a relatively slow rate, approximately four to six inches per minute being satisfactory when luminescent screens are being settled. Another factor which must be considered is that after the envelopes are carried past the dispenser 21 sufficient time must remain for the coating to settle out of solution onto the face of the envelopes before they are carried around the drive sprockets to the lower course. Thus, the maximum permissible speed will be determined by the length of the conveyor and the time required for settling. Since such coatings are sensitive to vibration it is necessary to maintain the rate at which the conveyor travels relatively slow.

*The dispenser*

Envelopes 63, Fig. 1, loaded onto the carriage in position A are carried up over the idler sprockets through position B whereas the envelopes continue in motion the dispenser is actuated to move into dispensing or operating position and deliver to each envelope a charge of coating ingredients. Referring now to Figures 1, 6–12, it is seen that dispenser 21 is supported on a platform 67 spaced above conveyor 20. As is apparent in Figure 6, platform 67 has an opening 68 and supports on one side of this opening a tubular column 69 on which is mounted a vertically movable slide 70. Also positioned on platform 67 and adjacent tubular column 69 is an air cylinder 71 which is vertically positioned and has a piston rod 72 rigidly connected to a shelf 70a integral with or connected to slide 70. Also connected to the piston rod 72 of the air cylinder and opposed thereto is a piston rod 73 of a hydraulic cylinder 74 connected to tubular column 69 at the upper ends thereof. Collar 75 is rigidly mounted on tubular column 69 adjacent the lower end of hydraulic cylinder 74. Hydraulic control valves 76, 77 are mounted one on each side on collar 75. Each control valve has a stem 78, 79 carrying a roll 80, 81, respectively. Spaced from each of the rolls 80, 81 is a backing roll 82, 83 adjustably connected to and rotatable on collar 75. Connected to shelf 70a intermediate the piston 72 and slide 70 are two upstanding cam rods 84, 85. As is most clearly shown in Figures 6 and 7, cam rod 84 passes between valve stem roll 80 and backing roll 82; these rolls being in rolling engagement therewith while cam rod 85 extends between roll 81 and backing roll 83. The cam rods being pivotally connected to shelf 70a, their lateral displacement is controlled by backing rolls 82, 83. Thus, it is seen that the backing rolls together with cam rods 84, 85 control the travel of valve stems 78, 79.

Air cylinder 71 has connected thereto adjacent each of its ends air lines 86, 87 connected to a source of air pressure and an exhaust line (not shown) through a solenoid actuated control valve 76. Hydraulic cylinder 74 is connected at each of its ends to a closed hydraulic fluid system which acts to control the operation of air cylinder 71. The lower end of hydraulic cylinder 74 is, as is schematically shown in Figure 16, connected to tube 87 leading to control valve 76. The other side of control valve 76 has a tube 88 open to accumulator 89 and which is connected to one side of control valve 77. The other side of the control valve 77 is connected to the upper end of hydraulic cylinder 74 by a tube 90. Since the amount of hydraulic fluid displaced from cylinder 74 varies as piston rod 73 enters and leaves the same, the accumulator is placed in the line to provide for this. The system is maintained completely full at all times by a suitable filler at 88a, Fig. 16. Also the system is maintained at some predetermined pressure to insure proper control. The desirable pressure will depend upon the load involved and is readily ascertainable.

Rigidly connected to the slide 70 adjacent the lower end thereof is an elevator frame 91 adapted to pass through the opening 68 in platform 67. Opposite tubular column 69 and positioned to the other side of elevator frame 91 is an upstanding supporting column 92 which is also carried by platform 67. Connected to the upper and lower ends of supporting column 92 by means of collars 93, 94 are vertically positioned bar rails 95, 96. Rails 95, 96 terminate at their upper ends in collar 93 which supports an upwardly presented extension 97 on which is rotatably mounted pulley 98. A cable 99, threaded through pulley 98, is connected at one end to elevator frame 91 as indicated at 100 while its other end is connected at 101 to a compensating weight 102 vertically slidable in the bore of supporting column 92. Positioned on a side of elevator frame 91 are two horizontal pins 104, 105 which extend into the passageway formed by bar rails 95, 96. Pins 104, 105 are vertically and horizontally displaced with respect to one another and carry rotatably mounted at their ends rolls 106 and 107, respectively. As is most clearly shown in Figure 7, roll 106 is in engagement with bar rail 95 while roll 107 is in engagement with rail 96 thereby eliminating the possibility of lateral sway as elevator frame 91 travels up and down.

Switches S5 and S6 may be mounted adjacent to one another supported by a collar 169 which is slidable on supporting column 92 and which may be clamped thereon in any desired position. Both of these switches are maintained closed by the elevator frame 91 when it is in its starting or raised position. Switch S5 is a triple pole switch and as indicated in Figure 17 is connected on one side to the source of electrical current supply while on the other side it is connected in series with each of the switches S3 as will be more fully described below.

Three similar dispensing units 108, 109 and 110 are disposed on elevating frame 91 and carried thereby. Inasmuch as the construction and operation of each of these dispensing units are identical in every respect, I shall point out in detail the specific construction and operation of only one such dispensing unit and for the sake of clarity and brevity, I have indicated corresponding parts of each dispensing unit with identical reference characters in the drawings. Dispenser 108 includes a liquid holding tank having three walled off compartments 111, 112 and 113, each being adapted to store a quantity of one of the ingredients to be discharged from the dispenser unit. As indicated, compartment 111 is provided with an agitator 114 though any or all of the compartments may be equipped with agitators as desired. Each compartment has an outlet opening provided with a valve seat 115 while a valve stem 116 depends from the cover of each compartment and carries a valve 117 which rests on valve seat 115 in sealing engagement therewith. At their upper ends valve stems 116 are each connected to a solenoid 118. The discharge openings from the three compartments are located adjacent to one another and each has a length of resilient tubing 119 in registration therewith and depending therefrom. Spaced intermediate the three tubes 119 and depending from elevator frame 91 is a rail 120 having three slideways 121, 122 and 123. Each of the slideways is presented toward one of the tubes 119. As most clearly shown in Figure 10, tubes 119 may be conveniently spaced 120° apart with respect to the center of rail 120. Solenoid actuated and air pressure operated clamps 124, 125 and 126 are slidably mounted respectively on slideways 121, 122 and 123 and each encircles one of the tubes 119. Each solenoid actuated clamp may be positioned in any desired location along the length of its slideway by means of a locking screw 127, and when deenergized pinch their respective resilient tubes 119 so as to collapse the walls thereof and make a liquid tight seal. To facilitate the location of each of the solenoid actuated clamps in its proper position, a graduated scale may be placed along rail 120 as indicated at 128. It should be understood that valve stems 116 as well as clamps 124, 125 and 126 are actuated by solenoids and operated by air pressure delivered from air cylinders not shown. The lower ends of tubes 119 are open to the atmosphere and overhang a funnel 128, the construction of which will now be pointed out.

Funnel or mixer 128, Figures 8, 9 and 11 (of which there are three, one for each of the dispenser units) is substantially rectangular in cross section having a depending spout 128a and carried by a cradle 129 to which it may be rigidly connected by means of straps 130 or the like. Cradle 129 is provided with four wheels 131 which run on the upper surfaces of two parallel tubular rails 132, the ends of which are supported by elevator frame 91 and which extend in a direction parallel the upper course of conveyor 20. Cradle 129 may be provided with two auxiliary wheels 133, one to run along and engage the under surface of each of the tubular rails 132. Cradle 129 is provided with a depending skirt portion 134 which substantially encircles the lower portion of funnel 128. A pair of bushings 135 one on each side of skirt portion 134 are mounted intermediate the ends thereof and to receive the pivots 136 of a U-shaped yoke 137 which (in Figure 11) extends around and below one end of funnel 128. The arms of the yoke extend somewhat beyond and above pivots 136 and have transverse bores 138 extending therethrough adjacent the ends thereof. As will be apparent, bores 138 are vertically disposed in one position of yoke 137 and tilted in another. A pair of rods 139 are slidable in bores 138 and depend from the arms of yoke 137. Collars 140 are adjustably connected adjacent the upper end of each of the rods 139 and abut against the upper surface of yoke 137 and thereby serve to support rods 139 in their lowermost position. A second ring-shaped collar 141 encircles each of the rods 139 intermediate its ends and may be clamped in any desired position along the length thereof. As is clearly apparent, collars 141 are positioned below yoke 137 while collars 140 are positioned above the same. Also encircling each of the rods 139 is a sliding bearing 142 each of which is vertically slidable along its respective rod intermediate the lower end of the rod and collar 141. A stop nut 143 or the like is threaded on the lower end of each rod 139 and serves to retain sliding bearings 142 when the same are in their lowermost position. An elongated platform 144 is supported and connected at each of its ends by one of the sliding bearings 142 and has suitably positioned apertures through which rods 139 extend. Depending from platform 144 is a trigger bar 145 the center of which is substantially in alignment with the axis of funnel spout 128a and the axis of the neck of an advancing envelope 63. The vertical length of trigger bar 145 (Figure 9) is such that it depends sufficiently far below platform 144 and the lower end of funnel spout 128a as to be engaged by the neck of an advancing envelope 63 when the dispenser 21 is in its raised position or removed from operating position. Extending from the edge of platform 144 (Figure 12) which is presented toward funnel spout 128a is a U-shaped lip 146. The center line of lip 146 is also in registration with the axis of spout 128a and its arms are so spaced apart as to lie one on each side of and adjacent to spout 128a.

An adjustable set screw 147 is centrally mounted on yoke 137 and engages a stop 148 carried by cradle 129 so as to control the maximum rotation out of horizontal position of yoke 137 about its pivots 136. Thus, the amplitude of the arc described by rods 139, platform 144 and trigger bar 145 is a function of the distance from the end of stop screw 147 to stop 148 when yoke 137 lies in a horizontal position.

A drip collector may be provided to catch drippings from spout 128a after it has been raised. Supported by skirt 134 of cradle 129 and extending transversely below funnel 128 (Figure 11) are a pair of rods 149, 150. Rods 149, 150 are horizontally disposed and are connected at each of their ends to skirt 134. Depending from rod 149 and pivotally connected thereto is a pair of parallel levers 151 (Figures 8, 9). A similar pair of parallel levers 152 are pivotally connected to and depend from rod 150. Levers 151 and 152 form a parallel system and are pivotally connected at their lower ends to the arms 153 of a drip pan 154. Drip pan 154 has an inclined floor which serves to direct any liquid collected by drip pan 154 toward an opening 155 formed therein and which is connected to a flexible waste pipe 156. A motor 157 is carried by skirt 134 of cradle 129 and has a crank 158. Interconnecting crank 158 and one of the levers 151 which supports drip pan 154 is a link 159 having a sleeve or collar 160 connected to one end thereof and which engages said lever 151. Motor 157 may be equipped with a one-half turn clutch so that when energized crank 158 turns 180° and then stops.

A switch S1 is carried by skirt 134 and is so positioned below yoke 137 as to be thrown by the yoke when the same moves from a tilted position to the horizontal position. Switch S1 may also serve to bias the yoke to its tilted position or separate biasing means in the form of a coil spring or the like may be used. Switch S2 is also carried by skirt 134 and depends therefrom so as to be closed by platform 144 after it has travelled upwardly along the rods 139 and when it reaches its uppermost position.

As pointed out, funnel 128 carried by cradle 129 is free to travel on tubular rails 132. In its starting or right-hand position (Figure 9) cradle 129 is in engagement with a switch S3 which it maintains open. Switch S3 is connected to elevator frame 91 and is positioned intermediate tubular rails 132. Another motor 161 is mounted on elevator frame 91 adjacent the starting or right-hand position of funnel 128 and drives a pulley 162 which winds a cable 163 when motor 161 is energized and which permits the cable to unwind freely when the motor is deenergized. Cable 163 is connected to the end of cradle 129 as at 164. In the position of the various parts shown in Figure 8, rods 139 carrying collars 140 have been displaced upwardly with respect to funnel 128. As pointed out cradle 129 carrying funnel 128 is free to travel toward the left of Figure 8 which direction coincides with the direction of travel of the line of envelopes 63 carried by conveyor 20 and over which dispenser unit 108 is disposed. Extending from the wall of elevator frame 91 toward which the cradle and funnel are free to travel as viewed in Figure 8 are two cams 165 each of which is positioned to engage the under surface of one of the collars 140; the collars being designed to slide along the upper surface of cams 165 so long as they are in contact therewith. Positioned on the same wall of elevator frame 91 and intermediate tubular rails 132 is an emergency switch 54 which is closed by the end of cradle 129 just before it reaches the end of its free travel.

Each of the funnels is provided with a pipe 166 (Figures 8, 9) having holes or outlets 167 and which extends around the funnel just inside the lip thereof. Pipe 166 is connected to a flexible water conduit 168 which in turn is connected to a source of water supply through a solenoid operated valve VI.

It is to be clearly understood that each of the dispenser units 108, 109 and 110 is disposed over a line of envelopes 63 which pass thereunder as they are carried along by the conveyor. As pointed out hereinabove, each of the dispenser units is provided with identical parts corresponding to those described in detail in connection with dispenser unit 108. Thus, each dispenser unit has, for example, a corresponding set of tubular rails 132 upon which its funnel 128 is mounted free to travel from a starting position in the same direction as the conveyor carries the three lines of envelopes 63.

The skirt 134 of yoke 129 is indicated in Figures 8 and 9 may be provided with a pair of switches S7 and S8 so mounted as to be actuated by a cam on crank 158, the operation of which will be more fully pointed out.

In operation a row of three envelopes 63 slowly approaches the dispenser moving from right to left (Figure 1), each of the envelopes being in line with one of the trigger bars 145. As shown in Figure 9, yoke 137 is in its normal position with set screw 147 up against stop 148. Elevator 91 carrying the three dispenser units 108, 109 and 110 is in its raised or starting position. In the schematic wiring diagram, Figure 17, the various switches and relays are shown as set just prior to the engagement of the trigger bars 145 by the envelopes. It is to be understood that the relays to be referred to are of the self-latching type while the timer, which may be mounted on the dispenser as indicated in Figure 1, is of the conventional motor driven multi-contact variety.

As each of the envelopes contacts its corresponding trigger bar 145 and continues to be carried along by the conveyor, this motion is imparted to each of the trigger bars, thereby rods 139 carried by yokes 137 swing about their pivots 136 (Figure 11). The yokes being pivoted, their right ends swing downward and throw switches S1.

As is apparent in Figure 17 one pole of each of the three switches S1 is connected in series between coil K1 of relay RL1 and the source of electrical power supply while the other poles are connected between switch S6 and the source. When all three of the yokes have been pivoted throwing the three switches S1, coil K2 is deenergized while K1 is energized unlatching relay RL1 and permitting the contacts thereof to drop down. Switch S7 being maintained closed by the cam on crank 158, the circuit is now closed to each of the drip pan motors which are now energized and rotate their cranks drawing the three drip pans out from under each of the funnel spouts 128a. After the cranks have rotated 180° switch S7 is allowed to open thus stopping the motors while switch S8 is closed by the crank completing the circuit to coil K3 of relay RL2. When coil K3 is energized relay RL2 is unlatched permitting its contacts to drop down and complete the circuit to coil K6 of valve V6 which when energized connects the upper end of cylinder 71 to the source of air pressure. Elevator frame 91 then starts down under the action of air piston rod 72 and controlled by the opposed hydraulic system through cam rod 85 and valve 77. As the elevator frame starts down switches S5 and S6 are opened. While the elevator frame continues downward funnel spouts 128a enter the necks of the envelopes while the rims of the envelope necks allow the trigger bars 145 to slide by until they abut the under surfaces of lips 146 on their respective platforms 144 and stop their further downward movement. Rods 139 continue downward until their collars 141 abut platforms 144 which had been previously stopped by the envelopes and arrest their further downward movement as well as rods 139. As the elevator frame continues downward, rods 139 having had their downward movement thus arrested, collars 140 are raised above cams 165. Just before elevator frame 91 reaches the end of its downward travel, the platforms close switches S2, the closing of any one of which starts the discharge cycle. By connecting the three switches S1 in series I insure that the dispenser will not start down until all of the envelopes have come into precise alinement with their funnel spouts. Thus, being assured of the alinement of the spouts and envelope necks, I connect the three switches S2 in parallel so that closing of any one of them initiates the discharge into all three envelopes and failure of one or even two of these switches does not interfere with the dispensing of the coating forming ingredients.

The timer is connected, as indicated in Figure 17, to the valves and pinch clamps of the dispenser units 108, 109, and 110; the corresponding solenoids of the three units being actuated simultaneously. In the present instance the timer program may be as follows: Valve VI opens and closes discharging a cushion of water into each of the envelopes, which water is only part of the total required. Then while each of the three sets of pinch clamps 124, 125 and 126 are closed the nine solenoids 118 are actuated raising valves 117 and allowing all tubes 119 to be filled above the pinch clamps with their respective ingredients. The corresponding pinch clamps of the dispenser units are set so as to measure equal amounts of the same ingredient. Then solenoids 118 are deenergized, closing valves 117 and the pinch clamps 124, 125, and 126 are opened allowing the measured quantities of ingredients to flow through the funnels into the envelopes. The pinch clamps are then closed when their solenoids are deenergized and valves V1 are once again opened and closed delivering the rest of the required amounts of water. This final charge of water also serves to flush the funnels as a result of the positioning of the pipes 166 around the lips of the funnels. Just before the timer resets itself for another cycle it momentarily energizes coil K4 of relay RL2, the contacts of which are shifted to the raised position where they are latched. With the contacts of relay RL2 raised, valve V6 is shifted connecting the lower end of air cylinder 71 to the source of air pressure and raising the elevator frame.

During the discharge cycle envelopes 63 have been continuously moving to the left in Figure 8 and the three cradles 129 with funnels 128 therein have been moving in the same direction. Cams 165 are of such length that before the elevator frame starts up collars 140 on rods 139 have been carried over their respective cams and are maintained raised even though platforms 144 are no longer being supported by the rims of their respective envelopes. With the trigger bars 145 being thus maintained raised envelopes 63 which have just received a charge of coating forming ingredients are free to be carried past thereunder. As the elevator frame reaches its fully raised position switches S5 and S6 are closed. Since switches S3 are normally closed the circuit is now closed to each of the funnel return motors 161 which now wind their cables 163 to return each of the funnels to their starting positions. As each funnel reaches its starting position the end of its cradle opens its switch S3 thus deenergizing its motor. When all of the funnels are returned all of the switches S3 are opened. After the funnels have started to move to the right under the influence of their cables, collars 140 are carried off of their respective cams 165 and rods 139, platforms 144 and trigger bars 145 are now free to drop down into position to be acted upon by the next row of envelopes. During the raising of elevator frame 91, trigger bars 145 were carried up out of engagement with the envelope necks thus permitting yokes 137 to pivot and throw the three switches S1 back to the position indicated in Figure 17. When switch S6 was closed as the elevator frame reached its raised position the circuit to coil K2 of relay RL1 was completed, energizing the same and shifting the contacts of this relay to the raised position. With the contacts of relay RL1 raised and since switch S8 has been closed during the discharge cycle, the circuit to the drip pan motors 157 is completed and the drip pans are returned to their positions underneath spouts 128*a*. On completion of the 180° revolution of crank 158 necessary to return the drip pans, switch S8 is opened while switch S7 is closed. The dispenser is now ready to repeat the same cycle on the arrival of the next row of envelopes.

Switches S4 are provided as emergency raise switches in the event the timer should fail to energize coil K4 of relay RL2 before any one of cradles 129 has reached the end of its free travel along its rails. It is apparent from Figure 17 that should any one of the switches S4 be closed, coil K4 is energized thus causing the raising of the elevator frame irrespective of the setting of the timer and thus avoiding damage to the apparatus or to the envelopes. Similarly, triggers 145 and yokes 137 insure alinement of all the spouts with their envelopes before the elevator frame can start down.

After having been charged with coating forming ingredients by the dispenser, the envelopes continue to be carried along the path of the upper course of the conveyor. The length of this path is such that at the speed at which the envelopes are traveling they do not reach position C at the end of the upper course until the coating or screen forming particles have settled out of solution. As the envelopes are carried beyond position C, they are gradually tilted to an inverted position when they arrive at D. During tilting excess liquid is poured out of the envelopes which is caught by splash guard 66 having channel 66*a* which leads off the waste liquid.

This pour off must be carried out very slowly, otherwise the settled screen will slip to become uneven. It must also be carried out continuously, since any hesitation in the action will cause a line on the screen where the surface of the pouring liquid hesitates.

To aid in the accomplishment of the first of these, the sprockets are large enough to give the desired slow speed of pour off with the best speed of settling. In the present example this is a pitch diameter of 39 inches. The second condition is inherent in the operation of the rest of the machine, i. e., continuous motion of conveyor without harmful vibration or hesitation. In the present instance, the travel of the chains and hence the upper and lower courses of the conveyor may be set at four inches per minute.

Rinse and dry

Next to be considered is the apparatus for setting the coating which may include as a preliminary step the washing and rinsing of the envelope followed by drying of the coating. Referring now to Figures 13, 14 and 15, it is apparent that tube envelopes 63 are carried inverted through the wash and rinse position 22 as well as dry position 23. A substantially rectangular platform 200 has upstanding side walls 201 and end walls 203, 204 forming a rectangular tank open at the top. As will be pointed out hereinafter platform 200 is vertically reciprocating in operation and therefore the tank walls are of such height that they do not interfere when in their topmost position with the passage of envelopes 63. Platform 200 is supported adjacent each of its corners by four identical and parallel linkages or link systems 205, 206, 207, 208 each of which comprises a long link 209 and a short link 210 one-half the length of link 209. Each link 209 is pivotally connected as at 211 to platform 200 adjacent each corner thereof, while the opposite ends thereof are each pivotally connected to a slide block 212 free to slide horizontally in a frame or slideway 213. The lower or left hand ends of links 210 looking in the direction of Figure 13 are pivotally connected to fixed blocks or lugs 214 and at their opposite ends are pivotally connected to the center of the corresponding long links 209 as indicated at 215. The sliding blocks 212 of linkages 205 and 206 are operatively interconnected by means of a rod or tie bar 216 while the slide blocks of linkages 207 and 208 are connected by rod or tie bar 217. Tie bar 217 extends through a bore 218 in a bridge 219 connected to or integral with a yoke 220. One end of yoke 220 is in face-to-face engagement with the sliding block of linkage 207 while the other end thereof is in engagement with the sliding block of linkage 208. On one side, bridge 219 is connected to piston rod 221 and piston 222 which is free to reciprocate in cylinder 223. Cylinder 223 is connected at 224 and 225 by means of suitable pipes to a solenoid operated valve V2 which, in turn, is connected on one side to a source of air pressure and on the other to an exhaust pipe. As will be more fully pointed out hereinbelow, solenoid operated valve V2 is connected to a source of electrical power supply through switches S10 and S11. For one operative position of valve V2, end 224 of cylinder 223 is connected to the source of air pressure while the other end 225 is connected to exhaust. In the other position of valve V2, end 224 is connected to exhaust and end 225 is connected to air pressure. As is clear from Figure 14, tie bar 216 is also connected to yoke 220 by means of bars 253 and 254. To permit fine adjustment of the rate of rise and descent of platform 200, yoke 220 is connected to piston rod 226 of piston 227 free to reciprocate in cylinder 228. As schematically indicated in Figure 14, the ends of cylinder 228 are connected through a conduit 229 having an accumulator 230 in the line. Cylinder 228, conduit 229 and accumulator 230 are filled with a suitable hydraulic fluid and the rate at which piston 227 may reciprocate is controlled by the hydraulic fluid, the passage of which, from one side of the piston to the other, is regulated by valves 231 and 232. Valves 231 and 232 are of the type which adjustably control the flow of hydraulic fluid in one direction while permitting the fluid to freely flow therethrough in the opposite direction. Thus, the control plunger of valve 231 is conveniently placed in contact with one suitably designed cam 231a on bar 253 and controls the rate at which platform 200 ascends. Valve 232 is similarly located in connection with another cam 232a carried by bar 253 and controls the rate of descent of platform 200.

On platform 200 are two rows of spouts 233 and 234. It is to be understood that there are as many spouts in each row as there are envelopes 63 in each row of envelopes across the conveyor 20. Also, the spouts are so disposed that they come to registration with the longitudinal or vertical axis of the envelopes that pass inverted over them. The spouts are preferably mounted on flexible rubber holders 235 to relieve the strain on the neck of the envelopes should one come into contact with a spout. Thus, as indicated, there may be six such spouts all of which are connected to a header 236 which, in turn, is connected to a source of washing solution by means of flexible tubing 236a through a solenoid operated valve V3 which is also actuated by the closing of switch S10. Spouts 233 and 234 are closed at the upper ends and have downwardly directed passages formed in their walls through which liquid is directed downwardly at the necks of envelopes 63 into which the spouts have been inserted. Concentric with the spouts and adjacent the upper ends thereof are arcuate tubes 237 which have inwardly directed perforations and which are also connected to the header 236. This permits simultaneous washing of the outer surfaces of the envelope necks with the washing of the inner surfaces thereof.

Switch S10 is supported by frame 24 in such position that it is actuated by each actuator bar 65 to bring platform 200 up and carry spouts 233 up into the necks of one row of envelopes while spouts 234 are carried up in the necks of the preceding row of envelopes; thus, each row of envelopes is washed twice, once by spouts 233 and once by spouts 234. Switch S11 may be mounted on frame 24 in such position that it is actuated by trip 238 connected to end wall 203 and is closed by the trip 238 as platform 200 arrives in its topmost position.

Positioned beyond wash and rinse platform 200 in the direction of travel of the lower course of conveyor 20 and to the right of platform 200 as shown in Figure 13, is an air-dry platform 239 which is supported on a system of four parallel linkages identical in all respects with those described in connection with platform 200. Furthermore, the linkages of platform 239 are actuated by compressed air and controlled by a hydraulic system also identical in every respect with that shown and described in connection with wash platform 200. Thus, platform 239 is supported by four linkages 305, 306, 307, 308; corresponding pairs of which are interconnected by tie bars 316 and 317. Tie bar 317 extends through a bore 318 in bridge 319 of yoke 320. Yoke 320 as in the case of yoke 220, is connected on one side to a piston rod and piston 321 and 322 which reciprocate in air cylinder 323. On the other side, yoke 320 is connected to piston and piston rod 328, 326, which reciprocate in cylinder 328. Ends 324 and 325 of cylinder 323 are connected through valve V5 to a source of air pressure or an exhaust line in accordance with the setting of valve V5. The detailed construction of these various parts will be apparent from an examination of the elevating mechanism of platform 200 and is, therefore, not repeated here.

Movably mounted on platform 239 and free to travel between the ends thereof is a dry rack 240 mounted on wheels 241 and which carries rows of air spouts 242 and 243. As in the case of spouts 233 and 234, the number of spouts in each row 242 and 243 is the same as the number of envelopes in each row across conveyor 20. Furthermore, the spouts are positioned so as to be in registration with the envelopes which successively pass over them. The air spouts may be suitably interconnected adjacent their lower ends by a system of conduits which is, in turn, connected to a source of compressed air by means of flexible tubing 244 through a valve V4. Depending from the right hand end or leading edge 240a of air rack 240 is a pin 245 which extends downwardly through an elongated longitudinal slot 246 in the floor of platform 239. As stated, air rack 240 is movable on platform 239 from left to right and back again. Positioned below platform 239 and having its center somewhat to the right of edge 240a of the air rack when the air rack is in its extreme left hand position is a rotatably mounted sprocket 247. A motor and sprocket 248 is disposed below platform 239 and to the right of the right hand end thereof. Sprockets 247 and 248 carry an endless chain 249 stretched between them. A plurality of spaced pins 250 are mounted on chain 249 and project horizontally therefrom. Sprockets 247 and 248 are so disposed with respect to slot 246 that pin 245 extending down through slot 246 may be engaged by one of the pins 250 on the upper course of chain 249 when the platform is in its lowered position. Motor and sprocket 248 drive chain 249 so that its upper course travels to the left in the direction of Figure 13 or counter clockwise.

Valve V5 is connected to a source of electrical power supply through switches S12, S13, S14 and S15. Switch S12 is disposed on frame 24 so as to be closed by each moving actuator bar 65 as it passes the same. Switch S13 which is normally closed is also supported on frame 24 and is so spaced apart from switch S12 as to be opened by one of the actuator bars a short time interval after switch S12 has been closed. Switch S14 is mounted adjacent the left hand end of platform 239 and is maintained closed so long as air rack 240 is in its starting or left hand position. Switch S15 is mounted adjacent the other end of platform 239 and is closed by air rack 240 as the same approaches its terminal position. Switch S16 is mounted on platform 239 to the right of or beyond switch S15 and acts as an emergency switch in the event switch S15 fails to function properly when closed by the air rack.

Flexible air tube 244 is connected to its source of compressed air through solenoid actuated valve V4 which is open when a switch S17 is closed. Switch S17 is so disposed on the supporting frame as to be closed by platform 239 when the platform reaches its raised position. Air rack 240 has centrally positioned on its left hand end looking in the direction of Figure 13 a tongue 251 which is releasably engaged by a latch 252 disposed in alinement therewith on the left end of platform 239 and which serves to releasably retain air rack 240 in its starting position when it has been returned thereto by chain 249. Supported on the sides of the air rack 240 are two alined elongated fingers 255 which extend upwardly and are of such length as to come into engagement with the connecting rod 54 of the carriage 48 which is in alinement with air spouts 242. Fingers 255 are of sufficient size and strength as to transmit the motion of the carriage with which they are in engagement to air rack 240.

In operation, after the envelopes have passed from C to D around the left hand end of the conveyor and have had excess liquid removed they arrive at position E where the actuator bar of each row closes switch S10 in passing. Switch S10 is connected to the source of current on one side and on the other side to coil K7 of relay RL3 through a time delay relay TD. When switch S10 is closed coil K7 is momentarily energized to unlatch the relay and allow its contacts to fall and is then deenergized by the action of time delay relay TD. With the contacts of relay RL3 down, coil K9 of valve V2 is energized shifting the valve so that the end 225 of cylinder 223 is connected to a source of air pressure while end 224 thereof is open to exhaust. This drives piston 222 to the left. Piston 222 being connected through its piston rod 221, bridge 219 and yoke 220 to both tie bars 216 and 217, its motion is transmitted through the four parallel linkages to platform 200 and elevates the same. The function of time delay relay or circuit breaker TD is to insure that coil K7 has been deenergized before platform 200 reaches its fully raised position. Since the envelopes continue in motion the wash and rinse time is relatively short. Simultaneous with the shifting of valve V2 by relay RL3, coil K11 of valve V3 is energized starting the flow of wash solution through spouts 233 and 234 which are carried up by platform 200 into the necks of the overhanging envelopes. As platform 200 reaches its operating or highest position it engages and closes switch S11 energizing coil K8 of relay RL3 which raises the contacts of this relay. Coil K11 of valve V3 is deenergized while coil K10 is energized shifting valve V2 which now connects the end 224 of cylinder 223 to air pressure while end 225 thereof is connected to exhaust. Piston 222 is now driven to the right and platform 200 is carried down to its starting position. It is to be understood that switch S10 is so positioned that when it is closed by one of the actuator bars, the envelopes carried by the carriage of which said actuator bar is a part are in registration with spouts 233 while spouts 234 are in registration with the envelopes of the next preceding row.

As the envelopes continue in motion the actuator bar of their carriage next engages and closes, in passing, switch S12. Immediately after switch S12 is closed, switch S13, which is normally closed, is opened by the actuator bar of the carriage next preceding the one which closed switch S12. Thus, if air rack 240 is in its left hand or starting position and is therefore maintaining switch S14 closed, coil K12 is momentarily energized releasing the contact of relay RL4 and permitting them to drop out. In this position of relay RL4, coil K14 of valve V5 is energized shifting this valve in the same manner coil K9 shifted valve V2. The elevating mechanism of platform 239 being identical to that of platform 200, its operation will be understood from the foregoing description of the elevation of platform 200. As platform 239 reaches its operating or raised position fingers 255 carried by air rack 240 are interposed in front of connecting rod 54 of the carriage which closed switch S12, the motion of this carriage being imparted to air rack 240 which is free to travel on platform 239 in the same direction the carriage is being carried by the conveyor. Also as platform 239 reaches its operating position, it closes a switch S17 energizing the coil of valve V4 starting the flow of drying air to spouts 242, 243. By the raising of platform 239 into operating position spouts 242 are carried up into the row of envelopes carried by the carriage which closed switch S12 while spouts 243 are carried up into the next preceding row of envelopes carried by the carriage which opened switch S13. As air rack 240 approaches the end of its free travel, its right hand end (Fig. 13) closes switch S15 energizing coil K13 and raising the contacts of relay RL4. With the contacts of relay RL4 raised coil K16 of valve V5 is energized shifting the valve and reversing the elevating mechanism of the dry platform 239 causing the same to be lowered. As platform 239 is lowered S17 opens deenergizing the coil of valve V4 and shutting off the flow of drying air. When platform 239 is back in its starting or fully lowered position, pin 245, depending through slot 246 from the end of air rack 240, is engaged by one of the projecting pins 250 on chain 249. With pin 245 thus engaged air rack 240 is carried back to its starting position where its left hand end closes switch S14 and tongue 251 is engaged by clamps 252.

By arranging switches S12, S13 and S14 as described hereinabove, I avoid the possibility that the air platform will be raised except when the air rack 240 is in its starting position when switch S12 is first closed. Thus if the air rack is not in its starting position when S12 is closed and fails to return before switch S13 is opened, a late return of the air rack will not close the circuit to start the dry platform up. The time interval between the closing of S12 and the opening of S13 is such if the dry platform goes up during that interval the air spouts will be in line with the envelopes and will enter their necks. When S13 has been opened the envelopes have travelled so far as to place them out of alinement with the air spouts. The required drying time is usually so long that in the present instance it is convenient to accomplish the drying of two rows of envelopes simultaneously. The drying time may be lengthened or shortened as desired by increasing the number of rows of air spouts and providing for a correspondingly longer travel for the air rack or by decreasing the same. The purpose of switch S14 is to prevent the closing of the circuit to valve V5 except when the air platform and the air rack are in their starting positions.

After the coatings or screens have been dried the envelopes continue to be carried by their carriages and holders along the path described by the lower course of conveyor 20 until they return approximately to position A. At position A the air valves of holders 58 may be manually opened and the envelopes removed from the holders.

In Figure 4, I have shown another form which the holders for the envelopes may take. Thus, instead of endless tubing 62, I may provide two fingers 172 mounted adjacent to the open end of a holder 173. A third finger 174 is preferably mounted on the wall of holder 173 intermediate fingers 172 and has connected to it an adjusting screw 175 which is in threaded engagement with the wall of holder 173. At its outer end screw 175 carries a thumb piece 176 by means of which finger 174 may be readily adjusted. When this type of holder is used it is mounted on carriages as hereinbefore described with respect to holders 58. With adjusting screw 175 unscrewed or turned out somewhat, an envelope may be inserted into holder 173. Then the adjusting screw is turned in until all of the fingers 172 and 174 are snug against the outside of the envelope. In view of the somewhat conic outline of such objects the base thereof is of larger diameter than the point around which the fingers are disposed and they therefore prevent the envelope from slipping out of the holders even when it is tilted or inverted. Screw 175 need only be tightened sufficiently to remove free play from the envelope with respect to the holder and should not be so tightened as to damage the object.

Instead of guide plates 40 (Figs. 1 and 2) having guide 42, I may provide guides in the form of flexible belts or straps 170 (Figure 5) at each of the four corners of conveyor 20. Such guide belts 170 may be connected at their ends to a suitable bracket on the conveyor frame through sufficiently strong biasing means such as coil springs 171. When such guides are utilized, upper rails 47 are provided with arcuate extensions 47a which terminate above the lower rails and spaced therefrom by a distance equivalent to the outside diameter of rolls 51, 52 of carriages 48. Those carriages which are passing around the ends of the conveyor rails are maintained thereon by the action of guide belts 170 on guide rolls 57, one of which projects outwardly from each of the two trucks 50 of carriages 48, the guide belt being positioned adjacent the rails for this purpose.

While I have indicated the preferred embodiments of my invention of which I am now aware and have also indicated only one specific application for which my invention may be employed, it will be apparent that my invention is by no means limited to the exact forms illustrated or the use indicated, but that many variations may be made in the particular structure used and the purpose for which it is employed without departing from the scope of my invention as set forth in the appended claims.

What is claimed is:

1. In an apparatus for applying coatings to surfaces of objects, carrier means adapted to carry said objects, means for moving said carrier means at a substantially constant speed, a dispenser adapted to discharge quantities of coating forming ingredients, said dispenser including a plurality of sources of different coating forming ingredients to be mixed before discharge to said objects, a funnel having its wider end adjacent said sources for receiving said different coating forming ingredients and mixing the same, and having a spout for directing the mixed ingredients to one of said objects, and means for moving said funnel toward said carrier means into dispensing position when said objects pass said dispenser.

2. In an apparatus for applying coatings to surfaces of objects, carrier means adapted to carry said objects, means for moving said carrier means at a substantially constant speed, a dispenser positioned above said carrier means and adapted to discharge doses of different coating forming ingredients, mixing means disposed between said dispenser and carrier for receiving said different ingredients and mixing the same, said mixing means having a discharge spout, and means for moving said discharge spout down into dispensing position when said objects pass said dispenser.

3. In an apparatus for applying coatings to surfaces of objects, carrier means adapted to carry said objects, means for moving said carrier means in rectilinear direction and at a substantially constant speed, a dispenser adapted to discharge coating forming ingredients when in dispensing position, said dispenser including at least two reservoirs above said carrier means of different coating forming ingredients, a funnel between said carrier means and said reservoirs and movable transversely of said reservoirs in said direction, and ducts from said reservoirs to said funnel for simultaneously discharging predetermined doses from said reservoirs to said funnels, said funnel having a spout at one end thereof and extending towards said carrier means, and means for moving said spout into dispensing position and engagement with one of said objects, whereby said funnel is moved in said rectilinear direction, the other end of said funnel being elongated in a direction parallel to said path, whereby said funnel is in vertical registry with said ducts during movement of the funnel.

4. In an apparatus for applying coatings to surfaces of objects, carrier means adapted to carry said objects, means for moving said carrier means in a rectilinear direction and at a substantially constant speed, a dispenser adapted to discharge coating forming ingredients when in dispensing position, said dispenser including storage means movable normal to said direction, for at least two different kinds of said ingredients, a funnel having its wider end adjacent said storage means for receiving and mixing said different ingredients, said funnel having a spout at its narrower end, means for intermittently moving said funnel into dispensing position and with said spout engaging one of said objects, a support for said funnel movable in said direction, whereby said funnel is moved with said one of said objects in said direction, the wider end of said funnel being elongated in cross-section with the longer dimension of said cross-section parallel to said path, whereby said funnel is in registry with said storage means during movement of the funnel.

5. In an apparatus for applying coatings to surfaces of objects, carrier means adapted to carry said objects, means for moving said carrier means in one direction and at a substantially constant speed along a predetermined path, dispensing means including a plurality of tank units and adapted to discharge a plurality of different coating forming ingredients when in dispensing position, said dispensing means further including one funnel for each of said units, said funnels being movably mounted with respect to and below said tank units and movable in said direction, the wider ends of said funnels having a cross-section including a relatively long dimension extending in said direction, and means for moving said funnels into engagement with said objects, whereby said funnels are moved along said long dimension and vertical registry between said tank units and said funnels is preserved.

6. In an apparatus for applying coatings to surfaces of objects, carrier means adapted to carry said objects, means for moving said carrier means at a constant speed along a predetermined path, movable dispensing means, means for intermittently moving said dispensing means toward said path, into dispensing position, and means associated with said dispensing means and for actuating the same when in dispensing position, said actuating means including a platform movable with said dispensing means into engagement with one of said objects, said dispensing means being movable with respect to said platform after said engagement, a normally closed switch on said dispensing means movable with said dispensing means in a predetermined path, said platform when in said engagement being in said path, whereby said switch is opened for starting a dispensing operation.

7. In an apparatus for applying coatings to surfaces of objects, carrier means adapted to carry said objects, means for moving said carrier means at a constant speed along a predetermined path, movable dispensing means including a valve, at least one spout connected to said dispensing means, means for intermittently moving said dispensing means toward said path into dispensing position and adapted to be actuated when said spout is in registration with one of said objects, said means for moving including a rod adjacent said spout and extending into said path for deflection in a given path by one of said objects, a power source connected to said dispensing means, and switching means in said given path for actuating said power source, and means for actuating said dispensing means when the same is in dispensing position, said actuating means including a platform fixed to and normal to said rod, said platform being adopted to engage and be stopped by one of said objects in response to said means for moving, said dispensing means including a switch movable in a path including said stopped platform for energizing said valve to open position.

8. In an apparatus for applying coatings to surfaces of objects, carrier means adapted to carry said objects, means for moving said carrier means at a constant speed in a predetermined direction along a predetermined path, movable dispensing means including a plurality of tank units and spouts for said units, means for intermittently moving said spouts toward said path into dispensing position, said means for moving including rods closely spaced from said spouts in a direction opposite to said predetermined direction, whereby said rods are laterally deflected by said objects in a given path, a power source connected to said dispensing means, a switching system including switches in the end portion of said given path connected in series to said power source and adapted to be closed by said rods for energizing said power source, said given path having a length substantially equal to the spacing between said rods and spouts, whereby said means for moving is actuated when each of said spouts is in registration with one of said objects, and means responsive to longitudinal movement of said rods with respect to said dispensing means for actuating said dispensing means when the same is in dispensing position.

9. In an apparatus for applying coatings to surfaces of objects, carrier means adapted to carry said objects, means for moving said carrier means in one direction along a predetermined path, movable dispensing means, including a plurality of tanks containing a plurality of different coating ingredients and at least one funnel movable with respect to said tanks parallel to said path and in said direction, for receiving and mixing said different coating ingredients, the wider end of said funnel being adjacent said tanks and having a relatively long dimension in cross-section parallel to said path, whereby said funnel is in registry with said tanks during relative movement between said funnel and tanks, and means for intermittently moving said dispensing means toward said path into dispensing position and back to starting position.

10. In an automatic apparatus for applying coatings to surfaces of objects, carriages adapted to carry said objects, means for moving said carriages in one direction at a constant speed along a predetermined path, dispensing means adapted to discharge measured quantities of coating forming ingredients, said dispensing means including a plurality of tanks, each containing a different coating ingredient and movable only in a direction normal to said one direction and a funnel movable with said tanks and in said direction, trigger means connected to said funnel and adapted to be engaged by said objects, and means actuated when said trigger is engaged by said object for moving said dispenser in said normal direction and toward said path into operating position, and with said funnel engaging one of said objects, whereby said funnel follows the movement of said one of said objects in said one direction.

11. In an automatic apparatus for applying coatings to surfaces of objects, carriages adapted to carry said objects, means for moving said carriages in one direction along a predetermined path at a constant speed, dispensing means adapted to discharge measured quantities of coating forming ingredients, said dispensing means including a plurality of tanks each containing a different coating ingredient and a funnel, said tanks and said funnel being movable towards said path, said funnel being movable in said direction parallel to said path, trigger means connected to said funnel and pivotable with respect thereto from a normal position to a biased position, said trigger means being adapted to be engaged by said objects as they pass predetermined points along said path, and be pivoted to said biased position, and reciprocating means for moving said dispensing means toward said path into operating position actuated when said trigger means reaches its biased position, whereby said funnel engages one of said objects and is moved therewith in said direction.

12. In an automatic apparatus for applying coatings to surfaces of objects, carrier means adapted to carry said objects, means for moving said carrier means in one direction along a predetermined path at a substantially constant speed, a dispenser adapted to discharge coating forming ingredients into said moving objects when in dispensing position, drip collecting means normally in position to collect drippings from said dispenser when the latter is out of dispensing position, means for moving said drip collecting means out of said normal position when an object is in registration with said dispenser, and means responsive to said means for moving said drip collecting means for moving said dispenser into dispensing position to discharge said ingredients when said drip collecting means is out of normal position and for returning said dispenser to starting position at the end of said discharge, said means for moving said drip collecting means being constructed and arranged to return said drip collecting means to normal position when said dispenser returns to its starting position.

13. An automatic dispenser for discharging measured doses of coating forming ingredients into moving objects, comprising at least one dispensing unit movable toward said objects into dispensing positions, a movable spout extending from said dispensing unit toward said objects and adapted to enter one of said objects when in registration therewith, drip collecting means depending from said dispenser unit and normally in position to collect drippings from the end of said spout, means for moving said drip collecting means out of said normal position when said one of said objects is in registration with said spout, means for actuating said dispenser unit when said spout is in said object to discharge a measured dose, and means responsive to said means for moving said drip collecting means for moving said dispenser unit into dispensing position and said spout into said object when said drip collecting means is out of normal position and for returning said dispenser unit to starting position at the end of said discharge, said drip collecting moving means being actuated to return said drip collecting means to normal position when said dispenser unit returns to starting position.

14. An automatic dispenser for discharging measured doses of ingredients into moving objects, comprising movable dispensing means adapted to discharge measured doses when in dispensing position, said dispensing means including a plurality of tank units and a funnel below said tank units, each of said tank units being adapted to discharge a measured dose of a different one of said ingredients to said funnel, whereby said ingredients are mixed in said funnel, means for moving said dispensing means into dispensing position as said objects pass in registration therewith, said funnel having a spout and adapted to enter one of said objects when said dispensing means is in dispensing position, said funnel being movably mounted on said dispenser means and adapted to move with said object so long as said spout is within the same.

15. An automatic dispenser for simultaneously discharging measured doses of ingredients into a plurality of moving objects, comprising an elevating frame, a plurality of dispenser units mounted on said frame, said dispenser units including a plurality of movable funnels one for each of said units and supported by said frame, each of said funnels having a spout, trigger means pivotally connected to each of said funnels and depending below the spout associated therewith, said trigger means being adapted to be engaged and pivoted by said moving objects through a predetermined distance, said trigger means being spaced from said spout said predetermined distance, whereby said spouts are in registration with said objects, and means actuated by said trigger means at the end of travel thereof through said predetermined distance for moving said elevating frame down toward said objects.

References Cited in the file of this patent

UNITED STATES PATENTS

| 1,110,990 | Provandie | Sept. 5, 1914 |
| 2,244,651 | Goebel et al. | June 3, 1941 |
| 2,316,972 | Pond | Apr. 20, 1943 |
| 2,383,023 | Sykes et al. | Aug. 21, 1945 |

FOREIGN PATENTS

| 2,512 | Great Britain | Feb. 4, 1896 |